Feb. 16, 1943.   J. W. SCHUTT   2,311,134
CONTINUOUS RECOVERY OF PYRIDINE
Filed Dec. 8, 1939
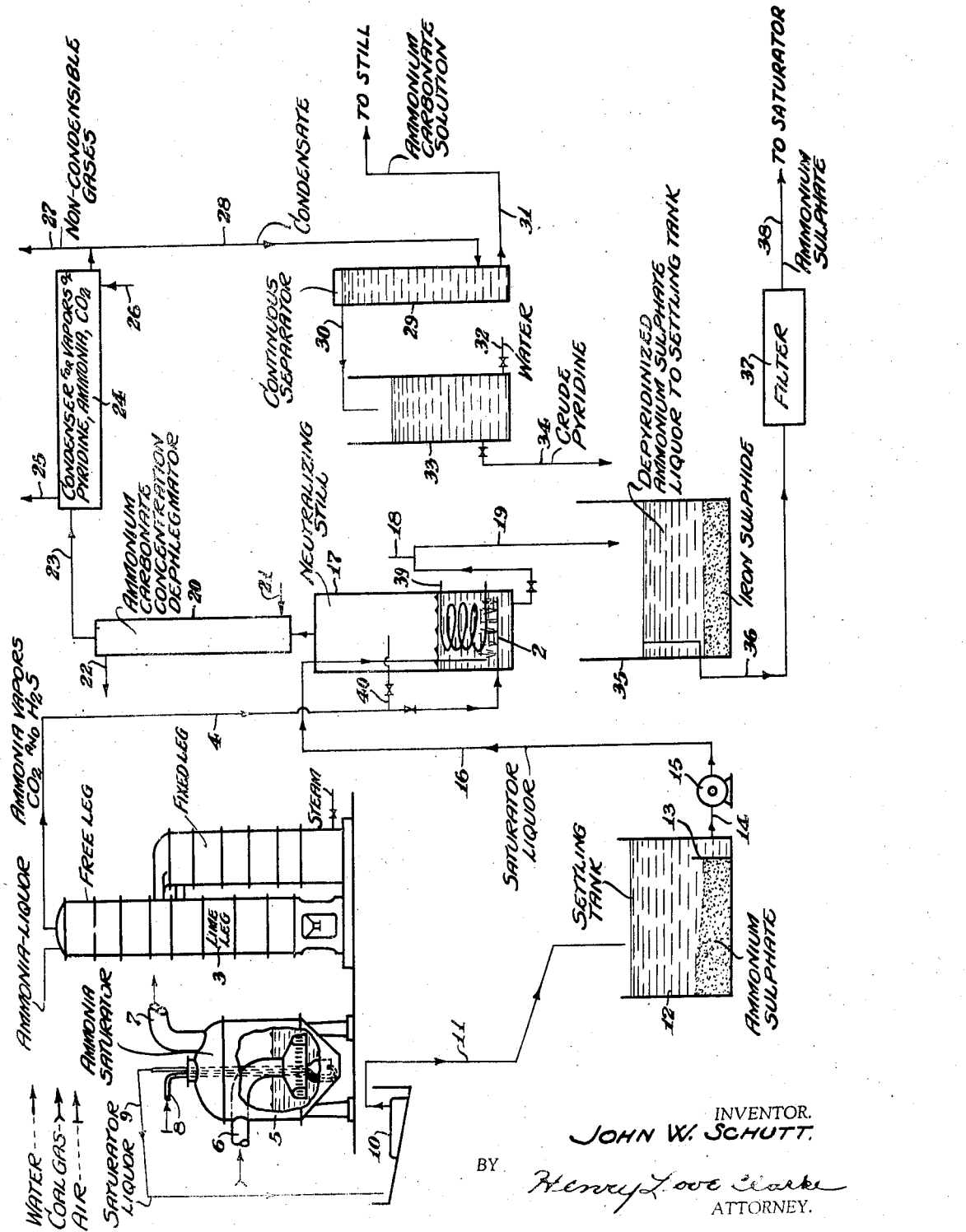
INVENTOR.
JOHN W. SCHUTT.
BY
Henry Love Clarke
ATTORNEY.

Patented Feb. 16, 1943

2,311,134

UNITED STATES PATENT OFFICE 2,311,134

CONTINUOUS RECOVERY OF PYRIDINE

John W. Schutt, North Arlington, N. J., assignor to Koppers Company, a corporation of Delaware Application December 8, 1939, Serial No. 308,237

14 Claims. (Cl. 260—290)

This invention relates in general to the recovery of pyridine bases from solutions and aqueous vapors. It also relates, and more particularly so, to the recovery of pyridine bases from coal gas produced in the coking process of a by-product coke-oven plant.

The crude gas evolved from the coal during its carbonization contains substantial amounts of pyridine and related bases which subsequently are to be found in the tar, ammonia liquor, ammonium sulphate, light oils, and other materials recovered in a by-product recovery system. After the removal of tar wherein some of the higher boiling pyridine bases are extracted, there still remains in the gas a considerable portion of the pyridine bases and especially of the lower boiling ones. In processes for the recovery of ammonia in the form of ammonium sulphate from by-product coke-oven gas, the gas and ammonia-containing vapors are passed through a sulphuric acid solution, the acid concentration of which is around 5 to 7%, thereby removing the ammonia and pyridine bases from the gas and vapors. The pyridine and related bases are held firmly in the acid ammonium sulphate solution until the concentration reaches about 2%. The pyridine then has an appreciable vapor pressure and is no longer held firmly in solution but instead there is an equilibrium condition established between the pyridine and related bases in the inlet gas and vapors, the bath, and the outlet gas and vapors, the equilibrium being controlled by the amounts of pyridine and related bases in the inlet gas and vapors and the temperature and acidity of the bath. From the foregoing it is apparent that if pyridine and its related bases are removed from the acid bath at a sufficient rate their vapor pressure above the bath is held to negligible proportions and therefore substantially all of the pyridine bases contained in the bath and inlet gases and vapors can be recovered.

In previous practice the recovery of pyridine and its related bases was usually accomplished by withdrawing form the acid solution of the ammonium sulphate bath a portion of said bath and then treating the so-withdrawn liquor with sufficient ammonia to neutralize the bath liquor and to liberate the pyridine bases, the heat of reaction being utilized in the distillation of the bases. The evolved pyridine and water vapors were condensed and the condensate treated with ammonium sulphate or other water-soluble salt so as to "salt out" the pyridine bases from the condensate. In the method of pyridine recovery exemplified by the Sperr and Brown U. S. Patent No. 1,414,441, assigned to Koppers Company and dated May 2, 1922, the saturator bath is allowed to reach a point of low acidity and is then steam distilled and the distillate condensed. The condensate comprises a water solution of pyridine bases from which the latter are separated by the addition of solid ammonium sulphate whereby the pyridine bases are "salted out" and float on the surface of the ammonium sulphate solution so-formed. It will be observed that in both of the above-mentioned methods it is necessary to add a salt to the pyridine-containing condensate in order that the crude pyridine can be separated. The separation is thus carried out in batch steps.

An object of the present invention is to provide a simple continuous process for the recovery of pyridine and its related bases from aqueous solutions in such manner that batch treatment of any intermediates as has been required in the prior art is not necessary.

Another object of the invention is to provide a process in a coke-oven by-product recovery system that will allow continuous removal of a portion of the pyridine-bearing saturator bath, continuous extraction of the pyridine contained therein and continuous return of the pyridine-free liquor back to the saturator thus creating a continuous pyridine recovery process.

Still another object of the invention is to provide a process in a coke-oven by-product recovery system that will provide ammonium sulphate of improved quality substantially free of foreign materials.

The invention has for further objects such other improvements and such other operative advantages or results as may be found to obtain in the process and processes hereinafter described or claimed.

According to the process of the present invention that saturator liquor, in a coke-oven by-product recovery system, free from suspended material is taken to a neutralizing still where ammonia vapors containing carbon dioxide from the free or unlimed leg of the ammonia still react with the saturator liquor rendering it alkaline. The mixture is then distilled and the evolved vapors are dephlegmated in order to concentrate the ammonia and carbon dioxide contained therein. The vapors are then passed through a condenser and cooled before they enter the continuous separator where the aqueous layer consisting essentially of a solution of ammonium carbonate and water is drained back into the ammonia recovery system. The supernatant crude pyridine layer is run from the separator to a receiver. The essential point in the process is the controlling of the vapor temperature by the dephlegmator so that the ammonium carbonate solution will be of sufficient concentration to make possible continuous gravity separation of the pyridine bases and the aqueous layer in the condensate. It will be understood that the dephlegmator can be omitted provided means are employed for the control of the temperature of the vapors exiting at the top of the still.

In the accompanying drawing forming a part of this specification and showing for purposes of exemplification a preferred apparatus and method in which the invention may be embodied and practised but without limiting the claimed invention specifically to such illustrative instance or instances, there is shown a schematic arrangement of the various features of apparatus used in the present pyridine recovery process.

Referring to the drawing the ammonia saturator 5 is shown with a gas inlet 6 where ammonia-laden gas enters the saturator and bubbles through an acid solution leaving behind the ammonia and any pyridine bases that are present and exist as an ammonia- and pyridine-free gas at the gas outlet 7. The saturator liquor containing ammonium sulphate and the pyridine bases can be removed either continuously or intermittently as desired from the saturator, provided an over-all rate that will prevent the loss of pyridine in the salt or in the outlet gases is maintained. The so-removed liquor is taken through the line 9 directly to the settling tank 12 or through a salt table 10 or other means of removing solid ammonium sulphate and then through line 11 to the settling tank 12. The settling tank 12 contains a baffle 13 and an outlet 14 placed as shown in the drawing so that any accumulation of ammonium sulphate can be readily removed and also any tars or neutral oils can be skimmed off the surface of the settling tank. The liquor leaves the settling tank through the line 14 to a pump 15 which transports the liquor into the neutralizing still 17 through the line 16. Ammonia vapors containing carbon dioxide and some hydrogen sulphide are taken from the free or unlimed leg of the ammonia still 3 through the line 4 into the neutralizing still 17 and are bubbled through the saturator liquor contained therein through a cracker pipe arrangement 2. The heat of reaction of the ammonia with the acid saturator solution has been found sufficient in practice to distill off the pyridine bases and ammonium carbonate along with some water, however, supplementary heat can be introduced through the steam coil 39. The vapors arising from the neutralizing still pass through a dephlegmator 20 where they are cooled to a temperature controlled so that the concentration of the ammonium carbonate in the exit vapors may be increased as aforementioned, i. e., to a concentration of ammonium carbonate sufficient to make possible gravity separation of the pyridine basis from the aqueous layer later when the exit vapors are condensed. The particular dephlegmator that is used in the accompanying drawing is operated by cooling water entering at the inlet 21 and leaving at the exit 22. Said dephlegmator may be of any particular construction, provided it is suitable for the control of the exit vapor temperature. As an example, the type of dephlegmator employed may be an ordinary cooler, without direct contact of the cooling water with the vapors, in which the function is simply to condense and return the water, thus assisting in a steam distillation of the ammonium carbonate and volatilization of the pyridine. Control of the temperature of the dephlegmator is to permit volatilization of the pyridine and ammonia together with the $CO_2$, accompanied by condensation and return to the neutralizer of some of the water vapor. The vapor temperature may be variously adjusted in accordance with empirical tests to give various concentrations of ammonium carbonate in the final condensate thus variously controlling the percentage of moisture present in the final crude pyridine product. With exit vapor temperatures of from 93–96° C. crude pyridine can be recovered with 15% moisture and, at slightly lower temperatures, 6% moisture. Of course, at too low a temperature all the pyridine will condense, and at too high temperatures there would be no gravity separation since too much water vapor will have passed over, thus reducing the concentration of the ammonium carbonate to a point at which there will be no significant difference in specific gravity. Empirical tests will show the proper temperature for gravital separation of pyridine of a predetermined percentage of moisture, for if the test shows pyridine but no gravital separation then the exit temperature obviously is too high, and if the test shows no pyridine at all then the exit temperatures obviously are too low. As a further guide there is given at the end of this specification criteria as to specific gravity. The vapors leaving the dephlegmator 20 pass through the pipe 23 into a condenser 24 where they are condensed, said condenser being provided with a cooling water inlet 26 and exit 25. The condensate leaving the condenser 24 may have some non-condensable gases which can leave by the vent 27. The condensate is then taken through the line 28 down to a separator 29 where the crude pyridine being lighter than the ammonium carbonate aqueous layer forms a supernatant layer in said separator and is withdrawn through the pipe 30 to a tank 33 with an elevated outlet 34 so that any water that might come over with the pyridine can be drained off through line 32 at the bottom of the tank. The crude pyridine is taken through the elevated outlet 34 to drums or other suitable containers. The heavier aqueous layer containing a controllable concentration of ammonium carbonate as above-mentioned is taken out of the bottom of the separator through a pipe 31 and returned back to the free leg of the ammonia still since the ammonia contained therein may readily be recovered. At the bottom of the neutralizing still 17 a seal 19 with vent 18 removes the depyridinized ammonia liquor to a settling tank 35 where iron sulphide and other iron salts are collected. The ammonia vapors from the ammonia still containing some hydrogen sulphide bubble through the saturator liquor in the neutralizing still 17 where the iron salts in the sulphate bath are reacted upon by the hydrogen sulphide to form sulphide salts which are collected in the settling tank 35 as above-mentioned. The purified ammonium sulphate liquor from the top of the settling tank 35 is removed through a line 36 either directly to the ammonia saturator or through a filter 37 which takes out any finely divided particles of iron or other salts and then to the saturator through the line 38 or to some storage facility for the so-purified ammonium sulphate liquor.

While the hereinabove described method of operating the process of invention is the preferred method, other variations of the process are practical and include such possibilities as neutralizing the withdrawn saturator liquor with any alkali and admixing with the vapors rising from the subsequent distillation a sufficient quantity of a volatile alkali and an acidic gas capable of reacting together to form a water-soluble salt, as will cause the final condensate to gravitally separate into an aqueous salt layer and a crude pyridine layer.

A variation of the process of invention as practised is shown in the drawing and consists of the addition of the line 40 whereby ammonia vapors containing carbon dioxide from the free leg of the ammonia still may be admixed directly with the vapors from the neutralizing still if so desired.

It has been found in practice that the control of the vapor temperature at the exit of the dephlegmator 20 makes possible the control of the amount of moisture in the crude pyridine by affecting the concentration of the ammonium carbonate in the aqueous layer of the final condensate. By adjusting the vapor temperature, results obtained in practice show that crude pyridine of substantially 6% moisture can be produced. With higher vapor temperatures, say 93 to 96° C., practice shows that crude pyridine can be produced of a water content of substantially 15%. If the vapor temperature at the dephlegmator exit gets too high, there will be no separation in the final condensate because the process depends upon having an aqueous layer containing sufficient ammonium carbonate to raise its gravity to a degree as will produce a gravital separation between the pyridine and the ammonium carbonate solution leaving crude pyridine of substantially 6–15% moisture. Tests have shown that a separation of the pyridine layer from the aqueous salt solution will be achieved when the gravity of the salt solution is above 1.025. Better separation, that is a separation giving a pyridine product of lower moisture, will be obtained by increasing the gravity of the salt solution to around 1.05. Further tests have shown that for a salt solution gravity of 1.05, the separated pyridine layer will contain about 11% of moisture.

It will be observed that in the process of the present improvement all materials necessary for its operation are available in the coke-oven by-product plants where the process would be mostly used.

The invention as hereinabove set forth is embodied in particular form and manner but may be variously embodied within the scope of the claims hereinafter made.

I claim:

1. A process for continuously recovering pyridine from the saturator bath liquor of an ammonium sulphate process, said process comprising: continuously withdrawing a portion of the saturator bath liquor from the saturator bath at a rate sufficient to maintain the vapor pressure of the pyridine fraction above the bath such that substantially all of the pyridine fraction contained in gas when passing through the bath is recovered by the bath from the gas; introducing into the so-withdrawn liquor to liberate the pyridine fraction present therein ammonia still vapors that are predominantly ammonia and contain carbon dioxide and hydrogen sulphide; distilling the mixture; dephlegmating the evolved vapors thereby to concentrate ammonia and carbon dioxide contained therein to an extent at which the aqueous fraction of the exit vapors will contain a sufficient concentration of ammonium carbonate to separate from the fraction containing pyridine by gravital separation when later condensed together; cooling the so-dephlegmated exit vapors to condense the aqueous fraction and the fraction containing pyridine; separating from each other by gravital separation the aqueous fraction and the fraction containing pyridine; continuously removing the gravitally separated fraction containing pyridine from the aqueous fraction; separating iron sulphide and other impurities from the distillation residue; and, continuously returning the substantially iron-free and pyridine-free ammonium sulphate solutions back to the saturator system.

2. A process for continuously recovering pyridine from the saturator bath liquor of an ammonium sulphate process, said process comprising: continuously withdrawing a portion of the saturator bath liquor from the saturator bath at a rate sufficient to maintain the vapor pressure of the pyridine fraction above the bath such that substantially all of the pyridine fraction contained in gas when passing through the bath is recovered by the bath from the gas; introducing into the so-withdrawn liquor to liberate the pyridine fraction present therein ammonia still vapors that are predominantly ammonia and contain carbon dioxide; distilling the mixture; dephlegmating the evolved vapors thereby to concentrate ammonia and carbon dioxide contained therein to an extent at which the aqueous fraction of the exit vapors will contain a sufficient concentration of ammonium carbonate to separate from the fraction containing pyridine by gravital separation when later condensed together; cooling the so-dephlegmated exit vapors to condense the aqueous fraction and the fraction containing pyridine; separating from each other by gravital separation the aqueous fraction and the fraction containing pyridine; removing the gravitally separated fraction containing pyridine from the aqueous fraction; and returning the distillation residue comprising substantially pyridine-free ammonium sulphate solution back to the saturator system.

3. A process for continuous recovering pyridine from the saturator bath liquor of an ammonium sulphate process, said process comprising: continuously withdrawing a portion of the saturator bath liquor from the saturator bath at a rate sufficient to maintain the vapor pressure of the pyridine fraction above the bath such that substantially all of the pyridine fraction contained in gas when passing through the bath is recovered by the bath from the gas; introducing into the so-withdrawn liquor to liberate the pyridine fraction present therein volatile alkali and acidic gas capable of liberating the pyridine fraction and reacting together to form a water-soluble salt; distilling thereafter the mixture; dephlegmating the evolved vapors thereby to concentrate the volatile alkali and acidic gas contained therein to an extent at which the aqueous fraction of the exit vapors will contain a sufficient concentration of the water soluble salt to separate from the fraction containing pyridine by gravital separation when later condensed together; cooling the so-dephlegmated vapors to condense the aqueous fraction and the fraction containing pyridine; separating from each other by gravital separation the aqueous fraction and the fraction containing pyridine; removing the gravitally separated fraction containing pyridine from the aqueous fraction; and returning the distillation residue comprising substantially pyridine-free ammonium sulphate solution back to the saturator system.

4. A process for continuously recovering pyridine from the saturator bath liquor of an ammonium sulphate process, said process comprising: continuously withdrawing a portion of the saturator bath liquor from the saturator bath at a rate sufficient to maintain the vapor pressure of the pyridine fraction above the bath such that substantially all of the pyridine fraction contained in gas when passing through the bath is recovered by the bath from the gas; introducing into the so-withdrawn liquor to liberate the pyridine fraction present therein ammonia still vapors that are predominantly ammonia and contain carbon dioxide and hydrogen sulphide; partially cooling the evolved vapors to an approximate temperature of 95° C. thereby to concentrate the ammonia and carbon dioxide contained therein to an extent at which the aqueous fraction of the exit vapors will contain a sufficient concentration of ammonia carbonate to separate from the fraction containing pyridine by gravital separation when later condensed together; condensing the so partially cooled vapors together and separating therefrom by gravital separation the aqueous fraction and the fraction containing pyridine with the pyridine fraction containing less than about 20% of moisture; removing the fraction containing pyridine from the aqueous fraction; separating iron sulphide and other impurities from the distillation residue; and returning the substantially iron-free and pyridine-free ammonium sulphate solution back to the saturator system.

5. In a process for recovering pyridine from the saturator bath liquor of an ammonium sulphate process wherein liquor from said bath is treated with ammonia still vapors containing carbon dioxide, the liquor being thereafter distilled, the vapors condensed, and the condensate stratified for separation of the pyridine, the step comprising dephlegmating the evolved vapors from the distillation step and thereby concentrating the ammonia and carbon dioxide contained therein to an extent at which in the subsequent stratification step the aqueous fraction contains sufficient concentration of ammonium carbonate to separate by gravity from pyridine.

6. A process for recovering pyridine from the saturator bath liquor of an ammonium sulphate process, said process comprising: withdrawing a portion of the saturator bath liquor from the saturator bath at a rate sufficient to maintain the vapor pressure of the pyridine in gas leaving the bath less than that of the pyridine contained in the gas entering the bath, so that the difference in pyridine contents is recovered by the bath from the gas; introducing into the so-withdrawn liquor to liberate the pyridine fraction present therein volatile alkali and acidic gas capable of liberating the pyridine fraction and reacting together to form a water-soluble salt; distilling thereafter the mixture; dephelegmating the evolved vapors thereby to concentrate said volatile alkali and acidic gas contained therein to an extent such that the aqueous fraction of the exit vapors will contain a sufficient concentration of the water soluble salt formed by their reaction to separate pyridine from the aqueous fraction by gravital separation when said dephlegmated vapors are later condensed together; cooling the so dephlegmated vapors to condense the aqueous fraction and the fraction containing pyridine; separating from each other by gravital separation the aqueous salt-containing fraction and the fraction containing pyridine; removing the gravitally separated fraction containing pyridine from the aqueous fraction; and returning the distillation residue comprising substantially pyridine-free ammonium sulphate solution back to the saturator system.

7. In a process for recovering pyridine from saturator-bath liquor of ammonium sulphate which comprises the steps of: alkalizing the liquor; distilling hot aqueous vapors therefrom containing the pyridine; cooling said vaporous mixture to condense the same; and separating therefrom by gravital separation an aqueous fraction and a fraction containing pyridine; the improvement comprising salting out the fraction containing pyridine from the aqueous fraction with ammonium carbonate; controlling the temperatures of the vapors exiting from the distilling step so that the ammonium carbonate will be of sufficient concentration in the aqueous fraction of the condensate in the separating step to raise the specific gravity of the aqueous portion to such an extent relative to that of the pyridine fraction as to effect the gravital separation of the pyridine continuously from the aqueous fraction of the condensate in the separating step mainly by reason of the extent of difference in specific gravity between the two; and removing the aqueous fraction from the gravitally separated fraction containing pyridine.

8. A process for recovering pyridine from saturator-bath solution of ammonium sulphate that contains the same, said process comprising: distilling said solution in the presence of a volatile alkali and an acidic gas capable of reacting together to form a water-soluble salt; separating part of the water from the evolved vapors and thereby concentrating the volatile alkali and acidic gas contained in the vapors to an extent such that the aqueous fraction of the exit vapors will contain a sufficient concentration of the water-soluble salt formed by their reaction to separate pyridine from said aqueous fraction by gravital separation when said vapors are later condensed together; cooling the said vapors to condense the aqueous fraction together with the pyridine fraction; separating from each other the salt-containing aqueous fraction and the fraction containing pyridine by gravital separation; and removing the gravitally separated fraction containing pyridine from the aqueous fraction.

9. A process for recovering pyridine from saturator-bath solution of ammonium sulphate that contains the same, said process comprising: distilling said solution in the presence of a volatile alkali and an acidic gas capable of reacting together to form a water-soluble salt; dephlegmating the evolved vapors and thereby concentrating the volatile alkali and acidic gas contained therein to an extent such that the aqueous fraction of the exit vapors will contain a sufficient concentration of the water-soluble salt formed by their reaction to separate pyridine from said aqueous fraction by gravital separation when said dephlegmated vapors are later condensed together; cooling the so-dephlegmated exit vapors to condense the aqueous fraction together with the pyridine fraction; separating from each other the salt-containing aqueous fraction and the fraction containing pyridine by gravital separation; and removing the gravitally separated fraction containing pyridine from the aqueous fraction.

10. A process for recovering pyridine from saturator-bath solution of ammonium sulphate that contains the same, said process comprising: liberating pyridine from the solution by the addition of an alkali; distilling said solution in the presence of a volatile alkali and an acidic gas capable of reacting together to form a water-soluble salt; dephlegmating the evolved vapors and thereby concentrating the volatile alkali and acidic gas contained therein to an extent such that the aqueous fraction of the exit vapors will contain a sufficient concentration of the water-soluble salt formed by their reaction to separate pyridine from the aqueous fraction by gravital separation when said dephlegmated vapors are later condensed together; cooling the so-dephlegmated vapors to condense the aqueous fraction together with the pyridine fraction; separating from each other the salt-containing aqueous fraction and the fraction containing pyridine by gravital separation; and removing the fraction containing pyridine from the aqueous fraction.

11. In a process for recovering pyridine from the saturator-bath liquor of an ammonium sulphate process, said process comprising, alkalizing liquor of said saturator bath, distilling the same and thereby removing vapors of pyridine and water, and thereafter condensing in the presence of each other said pyridine and water, the steps of separating part of the water from the evolved vapors from the distilling step before the condensing step, and in the condensing step simultaneously condensing ammonia and carbon dioxide along with the pyridine and water of the exit vapors from the separating step and in amounts to thereby concentrate ammonia and carbon dioxide therein to an extent such that the aqueous fraction of the condensate will contain a sufficient concentration of ammonium carbonate thereby to effect a gravital separation of pyridine as a layer distinct from the so formed aqueous solution of a carbonate of ammonia and thereafter subjecting the condensate to gravital separation.

12. In a process for recovering pyridine from the saturator-bath liquor of an ammonium sulphate process, said process comprising, alkalizing liquor of said saturator bath, distilling the same and thereby removing vapors of pyridine and water, and thereafter condensing in the presence of each other said pyridine and water, the steps of separating part of the water from the evolved vapors from the distilling step before the condensing step, and in the condensing step condensing ammonia and carbon dioxide along with the pyridine and water of the exit vapors from the separating step and in amounts to thereby concentrate ammonia and carbon dioxide therein to an extent such as to form with water of the condensate an aqueous solution of a carbonate of ammonia having a specific gravity of at least about 1.025, and thereafter subjecting the condensate to gravital separation so as to separate the pyridine as a layer distinct from the aqueous solution of ammonium carbonate.

13. In a process for recovering pyridine from saturator-bath liquor of ammonium sulphate which comprises the steps of alkalizing the liquid to liberate pyridine, distilling hot aqueous vaporous mixture therefrom containing the pyridine; cooling said vaporous mixture to condense the same; and separating therefrom by gravital separation an aqueous fraction and a fraction containing pyridine; the improvement comprising maintaining in the vaporous mixture being condensed a sufficient amount of a volatilized alkali and acidic gas as to form in the aqueous fraction of the condensate a solution of the volatilized alkali salt of the acid, which salt is volatile at the temperature of pyridine distillation, of such concentration as to effect the salting out of the pyridine from the condensate and its separation in the separating step by gravital separation therein.

14. In a process for recovering pyridine from saturator-bath liquor of ammonium sulphate, the steps comprising: alkalizing the liquor to liberate pyridine; distilling hot aqueous vapors therefrom containing the pyridine; maintaining in the aqueous vapors distilled from the alkalized bath liquor ammonia and carbon dioxide to form ammonium carbonate; controlling the temperature of the vapors existing from the distilling step so that the ammonium carbonate solution will be of sufficient concentration in the aqueous fraction of the vapors to continuously gravitatively salt out from the aqueous fraction of the condensate of the vapors, when later condensed together, the pyridine liberated from the strong acid of the bath by the alkalization; cooling said vaporous mixture to condense the same; and thereafter separating by gravital separation the aqueous fraction of ammonium carbonate from the pyridine fraction.

JOHN W. SCHUTT.